J. H. AUBLE.
LAWN MOWER.
APPLICATION FILED MAR. 24, 1904.
No. 930,329.
Patented Aug. 3, 1909.
2 SHEETS—SHEET 1.
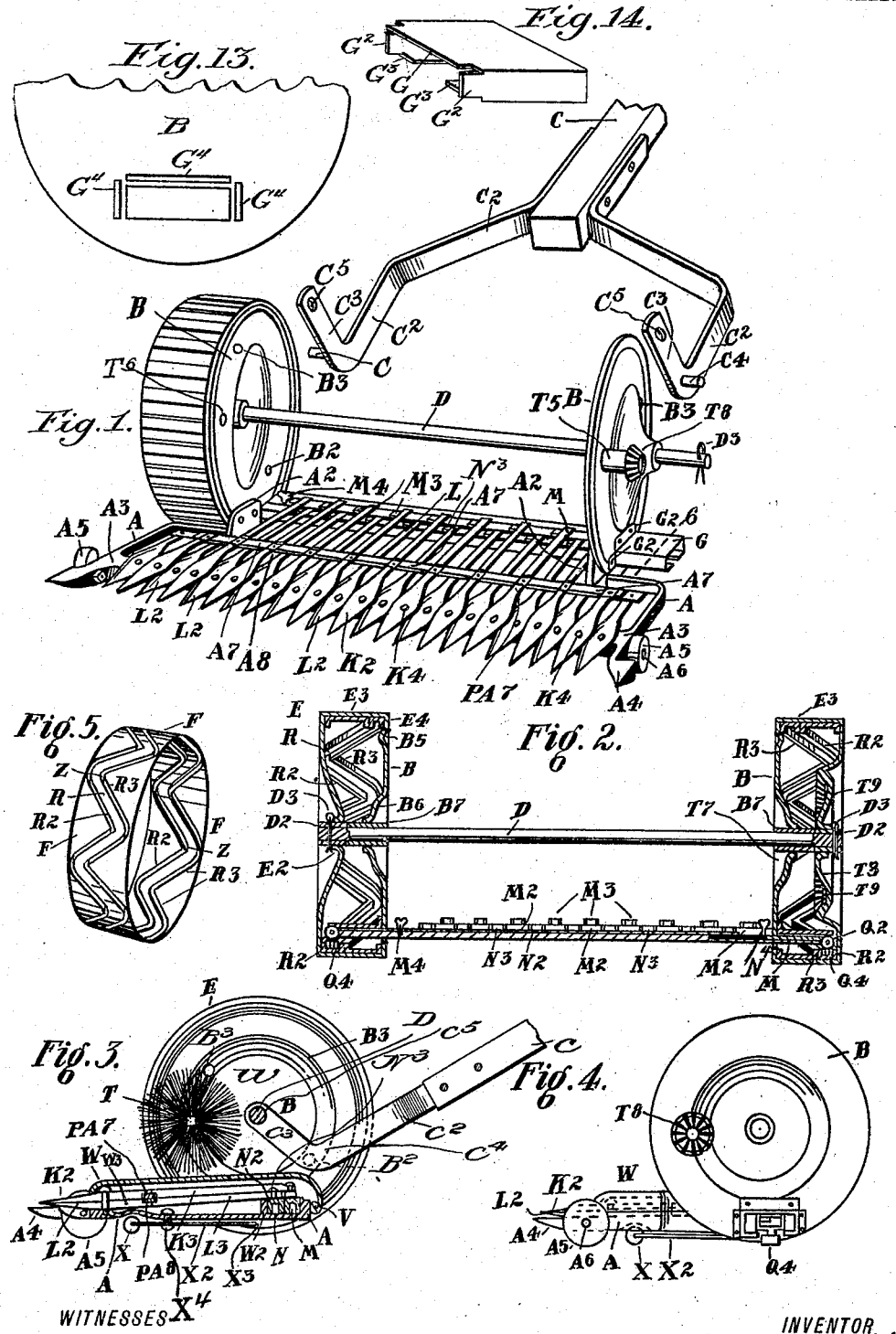

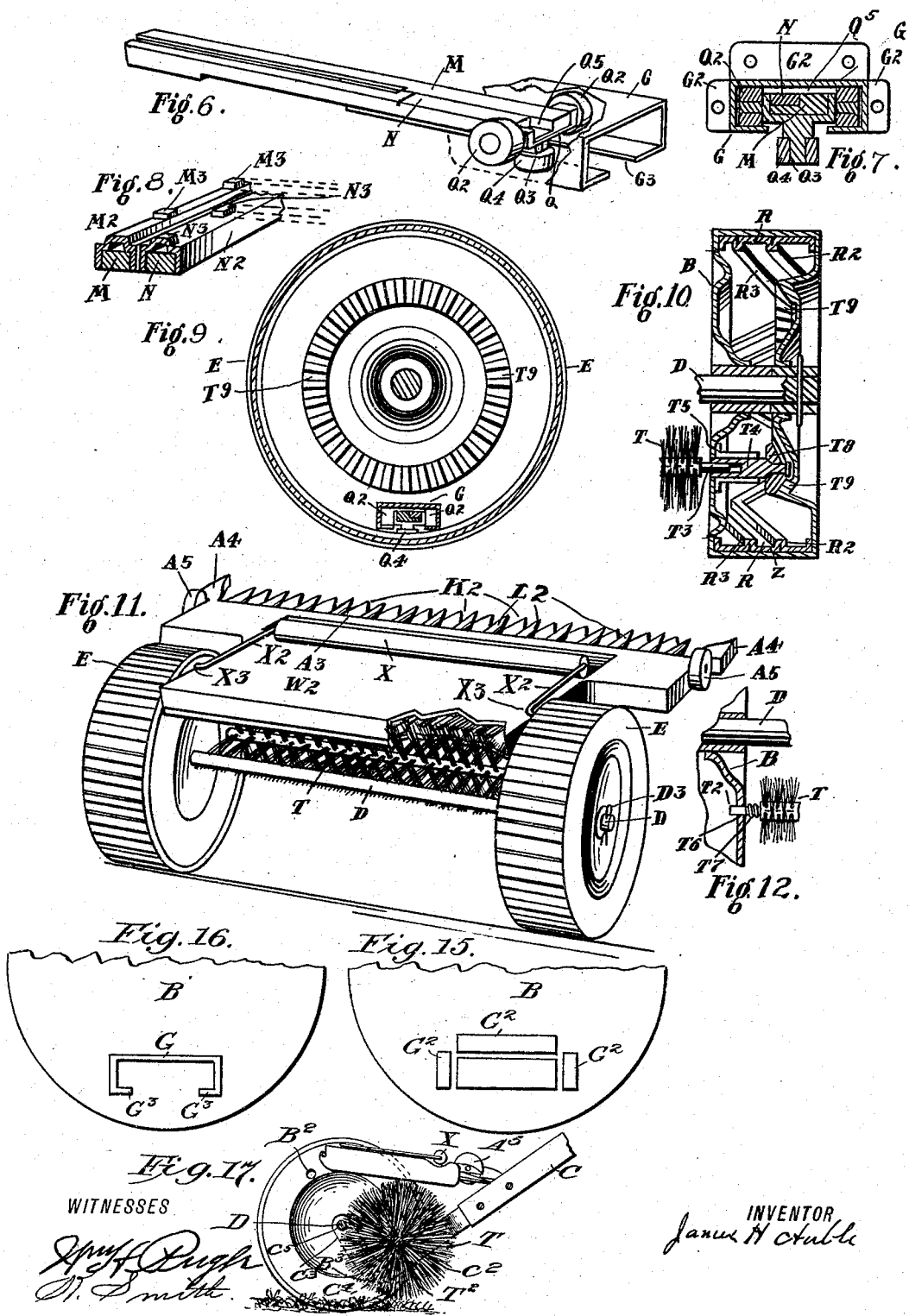

UNITED STATES PATENT OFFICE.

JAMES H. AUBLE, OF CINCINNATI, OHIO, ASSIGNOR OF ONE-THIRD TO JACOB H. BROMWELL, OF WYOMING, OHIO, AND ONE-THIRD TO JAMES J. McDONALD, OF CINCINNATI, OHIO.

LAWN-MOWER.

No. 930,329.      Specification of Letters Patent.      Patented Aug. 3, 1909.

Original application filed December 28, 1903, Serial No. 186,803. Divided and this application filed March 24, 1904.

Serial No. 199,801.

*To all whom it may concern:*

Be it known that I, JAMES H. AUBLE, a citizen of the United States, and a resident of the city of Cincinnati, in the county of Hamilton and State of Ohio, have invented certain new and useful Improvements in Lawn-Mowers, of which the following is a specification.

This is a division of application bearing Serial Number 186,803, filed December 28th, 1903, for lawn mowers.

The several features of my invention and the various advantages resulting from their use, conjointly or otherwise, will be apparent from the following description and claims.

In the accompanying drawings making a part of this application, and in which similar letters of reference indicate corresponding parts,—Figure 1 is a perspective view illustrating the greater part of a machine embodying my invention. In this view, one of the driving wheels is omitted, and the upper cover which protects the knives and their connections is absent. The brush also is absent. The handle is shown detached from the remainder of the machine. The upper part of the shank of the handle is broken off to economize space. Fig. 2 represents a vertical section of the machine taken in a plane passing through the center of the driving wheels, and their axle, the cover of the cutting mechanism being omitted. Fig. 3 represents a vertical transverse section of the machine, taken at or near the midlength of the axle aforementioned, the parts beyond the section being shown in elevation. A portion of the handle is shown in this view. Fig. 4 is an elevation of that end of the machine which is on the right hand in Fig. 1. In this view, the adjacent driving wheel has been removed, and the disk which fits the inside of said wheel is shown in elevation. Fig. 5 shows in a perspective view one of the two cylinders, each of which contains a groove whereby through intermediate mechanism the knives are operated. Fig. 6 shows in perspective, parts of the reciprocating rods, whereby the sleeves which operate the knives are respectively reciprocated, and a part of the guideway or bearing box which coöperates to guide these reciprocating rods. Fig. 7 is a transverse vertical section of the parts shown in Fig. 6, and of the corresponding parts shown in Fig. 1, the section being taken in the plane of the dotted line 6, of Fig. 1, and the flanges of the bearing box being shown in elevation. Fig. 8 shows in perspective parts of the reciprocating rods and of the sleeves, which they respectively reciprocate. Fig. 9 shows an elevation of a part of either one of the driving wheels illustrating the gearing on the wheel for operating the pinion of the brush. Fig. 10 is a horizontal, central, transverse section of one of the driving wheels and of the disk adjacent to it, and also showing in plan a portion of the main axle and a portion of the brush, and the mechanism for imparting a rotary movement to the brush. This section is taken in a plane passing through the main axle and through the axle of the brush. Fig. 11 is a perspective view of the machine showing the knives elevated out of the way, and the brush lowered part way toward the position wherein it can sweep up the litter of cut grass and debris left after the machine has been used to cut the grass. Fig. 12 is a central section of a part of that driving wheel which is opposite to the driving wheel shown in Fig. 10. The purpose of this view is to illustrate how the brush is held in position in the disks which support it. Fig. 13 is an elevation of the lower portion of either one of the disks, provided with slots for enabling the guideway for the bars or rods which act in transmitting motion to the knives, to be connected to the disk. Fig. 14 is a view in perspective of the guideway provided with flanges and ready to be united to the disk. Fig. 15 is an elevation of the lower part of the disk after the guideway has been connected thereto. That side of the disk is shown which faces inwardly, namely: toward the opposite disk. Fig. 16 is an elevation of the lower portion of the disk, after the guideway has been connected thereto. That side of the disk is shown which faces outwardly. Fig. 17 is a vertical section from front to rear of the machine, taken at or near the mid-length of the axle aforementioned, the parts beyond the section being shown in elevation. A portion of the handle is shown in this elevation. This view presents the position of the parts when the knives are elevated and are out of working position, and the brush is being employed to brush the loose grass which the machine reaches as it is moved onward.

The figures are not all upon the same scale, but the scale of the figures is varied to the better fulfil the purposes of illustration.

In the description of the figures, the groove is referred to as if the driving wheel were lying on its side.

A indicates the frame that contributes to support the knives. The flanges $A^2$, $A^2$ of this frame are respectively connected to the disks B, B, and thus support the frame A. This frame A carries a cross bar $A^3$ which supports the upper and lower tier of knife-blades.

The frame at the front is supported by suitable rollers or wheels $A^5$, pivoted at $A^6$ to the frame. The frame A in front of each roller preferably carries a wedge-shaped guard $A^4$, which latter operates to keep the grass, etc., away from the roller $A^5$ behind it, and prevents the latter from being clogged. But a special advantage is that this guard $A^4$ can be run close to trees, or fences, and will bring the grass to be cut. Thus little or no fringe of grass will be left at such places. At the rear there are two reciprocating rods, viz: rod M and rod N. Rod M carries a sleeve $M^2$, and the latter carries the lugs $M^3$. Rod M would slip within the sleeve $M^2$, but a set screw $M^4$ is provided whereby sleeve $M^2$ is compelled to move with rod M, until this screw is intentionally loosened. The rear end of the shank of the upper knives K is located between two adjacent lugs $M^3$.

The blade $K^2$ of each knife K is pivoted to the cross bar $A^3$ by a pivot, preferably by a screw $K^4$, whose shank above the screw thread is the pivot bearing. The head of the screw holds the blade down and prevents it from riding up and off the pivot. Thus when the rod M moves back and forth, it will reciprocate the sleeve $M^2$, and will move the rear ends of the knives K back and forth, and thus cause the knives to oscillate on their respective pivots $K^4$. Thus the blades $K^2$ of these knives will oscillate edgewise.

Rod N carries a sleeve $N^2$, and the latter has the lugs $N^3$. Rod N is prevented from slipping within sleeve $N^2$ by means of a set screw $N^4$. Thus the rod N and the sleeve $N^2$ may be made to reciprocate as one. The rear end of each of the shanks of the lower row of knives L is located between two adjacent lugs $N^3$. The blade $L^2$ of each knife L is pivoted to the cross bar $A^3$ by a pivot, preferably such as a screw $K^4$, whose shank above the screw thread is the pivot bearing. The head of the screw prevents the blade $L^2$ from coming off the pivot. The shanks of screws $K^4$ when used with blades $K^2$ are longer than when used with blades $L^2$. Thus when the sleeve $N^2$ and the rod N are reciprocated, the rear ends of the knives L will be moved likewise, and the knives L will be caused to oscillate on their pivots $K^4$. Thereby the blades $L^2$ of the knives L will oscillate edgewise. To conveniently enable the upper knives to work in a desired plane above the plane in which the lower knives operate, the sleeve $M^2$ is elevated relatively to the sleeve $N^2$.

In order to utilize the entire width of the machine, there should be knives in front of the driving wheels. To this end, upper and lower knives, as shown, are there located. The shanks of these knives are necessarily short and it would not be very practicable to respectively connect them to the reciprocating sleeves aforementioned. But these knives should be operated, and should operate in unison with the other knives. I provide two bars $A^7$ and $A^8$. The lower bar $A^8$ is connected to each of the knives of the lower tier by a pivot $PA^8$, and each of the knives of the upper tier is connected to the upper bar $A^7$ by a pivot $PA^7$. When the knives of the upper tier that are connected to the sleeve $M^2$, reciprocate, these knives move the bar $A^7$ and the latter moves the end upper knives connected thereto. When the knives of the lower tier which connect with the sleeve $N^2$ reciprocate, these knives move the bar $A^8$, and the latter moves the end lower knives connected to this bar.

It is to be understood that a shield W extends from the rear portion of the machine and over the knife shanks and over the blades, as far as to a line just in front of the pivots $K^4$. This shield is pivoted at the rear of the machine, at V. Thus it can at any time be raised, and access be had to the knives and the mechanism for reciprocating them. To raise the shield, take out the brush T. Take hold of the front edge (at the left hand in Fig. 3) of the shield, and lift it up. Then you get at the knives. The knife mechanism below is also protected by an under shield $W^2$. The latter shield is preferably formed in one with the main parts $A^3$, etc., of the frame, the whole being stamped out of a sheet of metal.

I provide a long roller X located near the front of the machine. This roller is to run on the ground, and is to support the front of the machine, the end rollers $A^5$, $A^5$, being in function supplemental to that of the long roller X. This long roller X is held by pivots, one at each end, and each pivot is preferably connected with an adjacent rod $X^2$ which latter extends backward and pivots in the adjacent disk at $X^3$. To accommodate this roller, and keep the knives down close to the ground, I form an arch or concave $W^3$ in the shield $W^2$, into which the upper part of the roller X fits. Thus the cutting mechanism can be low and the shield $W^2$ will not come into contact with the roller $X$. The rods $X^2$ may bear directly against the bottom of the shield $W^2$ substantially as shown, and thus the front portion of the machine is supported. But I prefer to have each rod $X^2$ rest against a set screw $X^4$ screwed into the frame. I can thereby adjust the rod and consequently the roller $X$ nearer to or farther from the frame $A$, and hence I am able to set the cutting knives nearer to or farther from the ground. I am thus enabled to regulate the height of the cut on the grass, etc.

The construction of the preferred means for operating these knives is as follows:—I provide guideways $G$, one at each wheel, and I connect the same to the adjacent disk $B$ in a suitable manner. Various ways of securing the guideways $G$ may be employed. Thus in Figs. 1, 2, 4 and 7, I have shown the guideways $G$ provided with flanges $G^2$, and these flanges of a given guideway are shown bolted to the adjacent disk. But a preferred mode of uniting these flanges to the disk is illustrated in Figs. 13, 14, 15, and 16, and is as follows:—I provide slots $G^4$ in the adjacent disk, and through these slots $G^4$ I pass the flanges $G^2$ of the guideway each flange $G^2$ through its adjacent slot. Then I bend that part of each flange $G^2$ which projects at the inside of the disk, and thus I clamp each guideway in place: See Figs. 15 and 16. In each of these guideways $G$ there moves a carriage $Q$, provided at each side with a wheel $Q^2$, pivoted to the carriage. At the bottom of this carriage is a stud $Q^3$ extending down through a slot $G^3$ of the guideway $G$, and provided with a roller or wheel $Q^4$ whose plane of revolution is at right angles to the plane of revolution of the driving wheels. To one of the carriages $Q$, under one driving wheel, the end portion of the rod $M$ is connected and to the other carriage $Q$ under the other driving wheel the adjacent end portion of the rod $N$ is connected. Thus when one carriage is moved by the adjacent driving wheel, the rod $M$ is reciprocated, and when the other carriage is moved by its driving wheel, the rod $N$ is reciprocated.

The carriage $Q$ is constructed to have a guide space $Q^5$, and in this, the end part of the other knife moving rod $M$ or $N$, as the case may be, slides along side of its companion rod. This construction is fully illustrated in Figs. 6 and 7. Thus each carriage serves also as a guideway and the two rods $M$ and $N$ with their respective sleeves $M^2$ and $N^2$ carrying their respective sets of knives move back and forth by each other, at all times near each other, and in parallel planes. The means for operating these rods through the intermediate agency of the roller or stud $Q^4$ are as follows:—Each driving wheel contains a zigzag or spiral guideway $R$, each having a side $R^2$ and an opposite side $R^3$. The roller $Q^4$ of one carriage is in one of these guideways and the roller $Q^4$ of the other carriage is in the other of these guideways. As the driving wheels revolve, the rollers $Q^4$ are caused to reciprocate and move their respective carriages $Q$, which latter in turn move their respective rods, and oscillate the knives thereof. Thus the upper knives operate with the lower knives to make a shearing cut after the manner of a pair of scissor blades, but with this additional difference that the blades are double-edged and cut at one side, and then at the other, in connection with the blades of the adjacent knives.

As the preferred special constructions of the grooves in the driving wheels, and of these wheels themselves constitute inventions separate from those herein claimed and described, further description of the same is herein omitted. The operation of the wheel, provided with these grooves and the functions of the latter in operating the knives as heretofore fully described, will be readily understood.

It will be perceived that the construction of the wheel and its cylinder $F$ are very advantageous. They are made of sheet metal, which is a material easily and cheaply worked. They are very light, and thus economize in the power required to move the machine over the grass, etc. It is to be understood that the disks turn loosely on the shaft or axle. They are prevented from approaching each other. The driving wheels $E$ are duly fixed to the axle and turn with it.

While the knives are cutting the grass, a brush $T$ operates to sweep that cut grass which falls on the machine backward and off of the machine. This brush is preferably supported by the disks $B$, $B$. The brush has a one end journal $T^2$, see Fig. 12, and a shaft end $T^3$ which is square shaped, see Fig. 10. The shaft end $T^3$ is adapted to enter the recessed axle $T^4$ rotatable in a sleeve $T^5$ in a disk $B$, and journal $T^2$ is adapted to enter the bearing $T^6$ in the opposite disk $B$. On this latter journal is a spring $T^7$. To connect the brush $T$ with the machine, the journal $T^2$ is first inserted in the hole $T^6$ for it, and pushed forward compressing the spring $T^7$. Then the shaft end $T^3$ is inserted into the recessed shaft $T^4$. The shaft end $T^3$ and the socket in the shaft $T^4$ are square shaped. Thus the rotation of the shaft $T^4$ compels the shaft $T$ to rotate. The spring $T^5$ will then obviously hold the brush in position. The recessed shaft $T^4$ is connected to a conically toothed wheel $T^8$. An internal beveled gear $T^9$ is fixed to the driving wheel $E$ and rotates therewith. The gear wheel $T^8$ meshes with the gear $T^9$, and is rotated thereby as the driving wheel revolves. Then both operations of cutting and of sweeping are carried on simultaneously. It is not intended that the bottom of the brush should touch the ground itself. The brush is so intentionally located that its bottom can be seven-eighths of an inch above the ground, or elevated as high as desired. This adjustment is accomplished by the elevation or depression of the handle in the hand of the operator. If it is desired to have the brush sweep the ground itself, the handle is held by the operator very low to the ground.

When the mowing machine is to be run from one place to another, and no cutting is to be done, it is desirable that the knives do not move, and it is desirable that the knives be elevated out of the way. The knives are readily put out of action, by unscrewing the set screws $M^4$ and $N^4$. This disengages the sleeves $M^2$ and $N^2$ from their respective rods M and N. These rods will continue to reciprocate as the driving wheels revolve, but the sleeves and the knives they carry will not reciprocate. When the cutting mechanism is to be out of the way, it is moved relatively to the ground by changing the position of the handle.

It is often desirable to sweep the cut grass into rows, or to collect and remove it. This can be done by means of the brush T, located relatively to the cutting mechanism, as shown in Figs. 3 and 4. When the cutting mechanism is elevated, it will occupy the position shown in Fig. 11, and as the wheels E move, will rotate and sweep the grass plot, etc. In case the cutting mechanism is elevated, and it is not desired to use the brush, the latter can be removed from the machine by reversing the manipulation whereby it was inserted therein.

The preferred construction of the handle and the mode of connecting it to the remainder of the machine, and of using it, is as follows:—Each arm C has two portions $C^2$, $C^3$, preferably made in one. Each arm near or at the junction of these portions $C^2$, $C^3$, is provided with a stud $C^4$. Each of the portions $C^3$ at its free end is provided with a hole $C^5$. The axle D passes through the holes $C^5$, $C^5$, of the arms. The arms $C^2$ of the handle have sufficient resiliency to permit the studs $C^4$ to be disengaged from the disks B. When the machine is in position to cut the grass, the studs $C^4$ are respectively in the adjacent holes $B^2$. When it is desired to elevate the knives and put the machine in the position shown in Fig. 11, then the studs $C^4$ are withdrawn from holes $B^2$, and inserted into their respective holes $B^3$, $B^3$. The machine can then readily be brought into the position shown in Fig. 11. The operator by lowering his end of the handle can cause the brush T to readily sweep the ground, and thus sweep up the litter thereon. By raising and lowering the handle, the proximity of the brush to the top of the grass or to the ground can be regulated. Instead of the holes $B^2$ and $B^3$, other suitable detents may be employed, in connection with studs $C^4$ or equivalent detents on the handle.

My improvements are applicable not only to mowing machines, but also to weed cutters, to harvesting machines and to the like, and I claim the application of the same broadly, wherever applicable.

Wherever in the specification and claims, the term mowing machine or the like is used, I desire it to be understood as covering machines and devices for any and all of the purposes mentioned in the preceding paragraph.

A great many slight changes might be made in the general form and arrangement of the parts described without departing from my invention. I therefore do not confine myself in each instance to the precise details set forth, but consider myself at liberty to make such slight changes and alterations as fairly fall within the spirit and scope of my invention.

What I claim as new, and of my invention and desire to secure by Letters Patent, is:—

1. In a mowing machine, the driving wheels having the zigzag grooved channels R, a roller or stud $Q^4$ adapted to move in each groove, and be reciprocated thereby, disks, guideways G, each connected to the adjacent disk, rods M and N in said guideways, rod M, connected to one of said parts $Q^4$, and rod N to the other, knives adapted to oscillate, and means by which the rods M and N respectively operate their knives, substantially as and for the purposes specified.

2. In a mowing machine, driving wheels, rollers or studs $Q^4$, connections intermediate between these and the driving wheels, disks, guideways G, respectively connected thereto, the rods M and N, reciprocable alongside of one another, a carriage Q provided with side wheels $Q^2$, and located in the adjacent guideway, and connected to the rod M, one of the studs $Q^4$ being also mounted on the carriage Q, and a similar carriage with side wheels $Q^2$, located in the opposite guideway and connected to the rod N, one of the studs $Q^4$ being also mounted on the latter carriage Q, each carriage adapted to receive support and guide the free end of the adjacent rod, and means whereby these rods reciprocate the knives, substantially as and for the purposes specified.

3. In a mowing machine, disks hung on the axle, the knives, rods for reciprocating the knives, driving wheels provided with grooves, mechanism intermediate between these wheels and the rods for actuating the latter from these grooves, guideways for such mechanism, the guideways provided with flanges secured to the adjacent disks, substantially as and for the purposes specified.

4. In a mowing machine, disks hung on the axle, the knives, rods for reciprocating the knives, driving wheels provided with grooves, mechanism intermediate between these wheels and the rods for actuating the latter from these grooves, guideways for such mechanism, the guideways provided with flanges passed through slots in the adjacent disks, and bent, substantially as and for the purposes specified.

5. In a mowing machine, an axle D, driving wheels thereon, and disks hung on said axle, a series of cutting knives, means whereby the driving wheels operate them, the knives located in a frame connected rigidly to said disks, a cylindrical brush whose axle is received into said disks, and supported thereby, one end of said axle being provided with a spring, the other end being connected with a sleeve rotatable in a bearing of the disk, and provided with a gear wheel, a circular gear, connected with the adjacent driving wheel and engaging the said gear which turns said brush, substantially as and for the purposes specified.

6. In a mowing machine, an axle D, driving wheels thereon, and disks hung on said axle, a frame connected rigidly to said disks a series of cutting knives, means whereby the driving wheels operate them, the knives located in the frame a cylindrical brush whose axle is received into said disks and supported thereby, intermediate means between the brush and a driving wheel for rotating the said brush, a platform the brush being located relatively to the platform, so that when the knives are cutting, the brush will clear the platform of the cut grass, etc., and when the knives are thrown up out of the way, the brush will operate to sweep the ground, substantially as and for the purposes specified.

7. In a mowing machine, an axle D, driving wheels thereon and disks hung on said axle, a frame connected rigidly to said disks a series of cutting knives, means whereby the driving wheels operate them, the knives located in the frame, a cylindrical brush the ends of whose axle are received into said disks, and supported thereby, intermediate means between the brush and a driving wheel for rotating the said brush, a platform, the brush being located relatively to the platform, so that when the knives are cutting, the brush will clear the platform of the cut grass, etc., and when the knives are thrown up out of the way, the brush will operate to sweep the ground, a handle having two arms each arm having its front end $C^3$ angulated relatively to its rear portion $C^2$ and a stud $C^4$, the said front end $C^3$ being provided with the hole $C^5$, the axle D passing through said holes, the disks aforesaid being provided with the holes $B^2$ and $B^3$, whereby the position of the handle can be changed relatively to the ground and brush, substantially as and for the purposes specified.

8. In a machine for cutting grass, etc., the combination of an axle D, the disks B, provided with holes $B^2$, $B^2$, and $B^3$, $B^3$, located therein, a knife platform, knives, a brush, a handle C, having arms each composed of the front end $C^3$ angulated relatively to the rear portion $C^2$, each arm having a pivot hole $C^5$, for the reception of the axle D, and the pivots $C^4$, respectively located on the arms and adapted to be received at will into the holes $B^2$ or $B^3$, means for operating the knives and means for positively rotating the brush, substantially as and for the purposes specified.

9. In a machine for cutting grass, etc., the combination of an axle D, the disks B, provided with holes $B^2$, $B^2$, and $B^3$, $B^3$, located therein, a knife platform, knives, a brush, a handle C, having arms each composed of the front end $C^3$ angulated relatively to the rear portion $C^2$, each arm having a pivot hole $C^5$, for the reception of the axle D, and the pivots $C^4$, respectively located on the arms, and adapted to be received at will into the holes $B^2$ or $B^3$, the arms $C^2$, $C^2$ of the handle being laterally elastic, means for operating the knives and means for positively rotating the brush, substantially as and for the purposes specified.

10. In a machine for cutting grass, etc., the combination of an axle D, the disks B, provided with holes $B^2$, $B^2$, and $B^3$, $B^3$, located therein, a knife platform, knives, a brush located relatively to the platform so that when the knives are cutting, the brush will clear the platform of the cut grass, etc., and when the knives are thrown up out of the way, the brush will operate to sweep the ground, a handle C, having arms each composed of the front end $C^3$ angulated relatively to the rear portion $C^2$, each arm having a pivot hole $C^5$, for the reception of the axle D, and the pivots $C^4$, located on the arms and adapted to be received at will into the holes $B^2$, or $B^3$, the arms $C^2$, $C^2$, of the handle being resilient laterally, means for operating the knives and means for positively rotating the brush, substantially as and for the purposes specified.

In witness whereof, I have hereunto set my hand in the presence of two subscribing witnesses.

JAMES H. AUBLE.

Attest:
 Wm. H. Pugh,
 K. Smith.